United States Patent
Domingues Dos Santos et al.

(10) Patent No.: US 10,189,926 B2
(45) Date of Patent: Jan. 29, 2019

(54) METHOD FOR PREPARATION OF DERIVATIVES OF POLYVINYLIDENE FLUORIDE

(71) Applicant: ARKEMA FRANCE, Colombes (FR)

(72) Inventors: Fabrice Domingues Dos Santos, Paris (FR); Thierry Lannuzel, Villeurbanne (FR)

(73) Assignee: ARKEMA FRANCE, Colombes (FR)

( * ) Notice: Subject to any disclaimer, the term of this patent is extended or adjusted under 35 U.S.C. 154(b) by 22 days.

(21) Appl. No.: 15/517,055

(22) PCT Filed: Sep. 21, 2015

(86) PCT No.: PCT/FR2015/052523
§ 371 (c)(1),
(2) Date: Apr. 5, 2017

(87) PCT Pub. No.: WO2016/055712
PCT Pub. Date: Apr. 14, 2016

(65) Prior Publication Data
US 2017/0298161 A1    Oct. 19, 2017

(30) Foreign Application Priority Data
Oct. 6, 2014 (FR) ..................... 14 59543

(51) Int. Cl.
*C08F 214/22* (2006.01)
*C08J 5/18* (2006.01)
*C08F 2/00* (2006.01)
*C08F 214/18* (2006.01)
*C08F 214/24* (2006.01)

(52) U.S. Cl.
CPC ............ *C08F 214/22* (2013.01); *C08F 2/001* (2013.01); *C08F 214/182* (2013.01); *C08F 214/24* (2013.01); *C08J 5/18* (2013.01); *C08J 2327/16* (2013.01)

(58) Field of Classification Search
USPC .......................................... 526/255; 525/199
See application file for complete search history.

(56) References Cited

U.S. PATENT DOCUMENTS

| | | | |
|---|---|---|---|
| 4,756,599 A * | 7/1988 | Maeda | C08F 214/22 374/131 |
| 6,355,749 B1 * | 3/2002 | Chung | C08F 214/22 526/195 |
| 9,053,617 B2 * | 6/2015 | Ramstein | G06F 3/016 |
| 2015/0307673 A1 * | 10/2015 | Domingues Dos Santos | C08F 214/222 526/249 |

FOREIGN PATENT DOCUMENTS

WO    2014/091130 A1    6/2014
WO    WO-2014/091130 A1 *    6/2014

OTHER PUBLICATIONS

International Search Report dated Dec. 14, 2015, issued in corresponding PCT/FR2015/052523, 2 pages.
English translation Abstract of WO2014091130A1 published Jun. 19, 2014 (1 page).

* cited by examiner

*Primary Examiner* — Mark Kaucher
*Assistant Examiner* — Henry Hu
(74) *Attorney, Agent, or Firm* — Millen, White, Zelano and Branigan, P.C.

(57) ABSTRACT

The invention relates to a method for preparation of a polymer from monomers comprising polyvinylidene fluoride, trifluoroethylene and a third monomer, the method successively comprising: injection of all the monomers to react into a reactor; initiation of a polymerization of the monomers; a continuation step (a) of the polymerization of the monomers, during which a drop in pressure in the reactor is compensated.

16 Claims, No Drawings

METHOD FOR PREPARATION OF DERIVATIVES OF POLYVINYLIDENE FLUORIDE

FIELD OF THE INVENTION

The present invention relates to a method for preparing derivatives of polyvinylidene fluoride (PVDF) and more particularly terpolymers prepared from vinylidene fluoride (VDF), trifluoroethylene (TrFE) and a third monomer.

TECHNICAL BACKGROUND

Fluoropolymers represent a class of compounds having noteworthy properties for a large number of applications, from painting or special coatings to sealing joints, optics, microelectronics, and membrane technology. Among these fluoropolymers, copolymers are particularly interesting due to their diversity, morphology, exceptional properties and versatility.

In particular, polymers based on VDF and TrFE have been proposed as ferroelectric materials which generate mechanical actuation induced by an external electric field. These polymers have been recognized for applications in a variety of transducers, actuators and sensors.

It has also been discovered that the use of a third monomer bearing a bulky substituent made it possible to disrupt the crystallization of the ferroelectric polymers based on VDF and TrFE, so as to give them properties of relaxor materials with significant electrostrictive effects.

Nonetheless, the introduction of this third monomer is generally reflected by a decrease in the melting point of the polymer and also a decrease in the mechanical strength thereof, measured by Young's modulus, which limits the possible uses thereof and constitutes an obstacle to the use thereof.

Document EP 0129244 describes P(VDF-TrFE-HFP) terpolymers, in which HFP denotes hexafluoropropylene, and also the manufacture thereof. More particularly, according to the document, the HFP monomer is first loaded into an autoclave, then a gaseous mixture of VDF and TrFE is added. The reaction is initiated by adding a radical polymerization initiator. This gaseous mixture of VDF and TrFE is then injected continuously to keep the pressure constant during the reaction.

Document FR 2889193 describes terpolymers of VDF and TrFE with a third monomer, especially CFE (1,1-chlorofluoroethylene), and the manufacture thereof. More particularly, according to the document, a gaseous mixture of VDF, TrFE and CFE is loaded into an autoclave with a polymerization initiator. A mixture of the three monomers is then injected continuously at constant pressure.

Document WO 2009/147030 describes P(VDF-TrFE) copolymers and also P(VDF-TrFE-CTFE) terpolymers, in which CTFE denotes chlorotrifluoroethylene, and also the manufacture thereof, which is carried out in a similar way to that which has been described above.

Document EP 0391421 also describes P(VDF-TrFE-CTFE) terpolymers and also the manufacture thereof. The document teaches preparing the terpolymers analogously to that which has been described above. In addition, in examples given by way of comparison, only an initial loading of monomers is provided, and the pressure in the reactor therefore decreases during the reaction. A terpolymer having a VDF/TrFE/CTFE molar ratio of 65/29/6 and having a melting point of 135° C. is obtained with this method.

Document U.S. Pat. No. 4,554,335 also describes P(VDF-TrFE-CTFE) terpolymers and also the manufacture thereof. According to the example provided, this manufacture is carried out by loading an autoclave with the three monomers according to a VDF/TrFE/CTFE molar ratio of 65/30/5, by heating to initiate polymerization and by continuing the reaction for 3 hours with a reduction in the pressure. The polymer obtained has a melting point of 140° C.

Document WO 2010/116105 describes a method for manufacturing P(VDF-TrFE-CTFE) or P(VDF-TrFE-CFE) terpolymers. This method proposes initial loading of only VDF and TrFE into an autoclave, initiation of the reaction by injecting initiator, then continuous injection of a mixture of the three monomers.

Other polymerization methods in the prior art rely on specific techniques of initiation chemistry. These are very difficult to implement on an industrial scale.

This is the case, for example, of the technique described in document U.S. Pat. No. 6,355,749, which relies on the use of organoborane molecules.

There is therefore a need to develop polymers based on VDF and TrFE having a relatively high melting point and a relatively high mechanical strength, and simultaneously properties of relaxor materials with significant electrostrictive effects.

SUMMARY OF THE INVENTION

The invention firstly relates to a method for preparing a polymer starting from monomers comprising vinylidene fluoride, trifluoroethylene and a third monomer, the method comprising, successively:
  injecting all the monomers to be reacted into a reactor;
  initiating polymerization of the monomers;
  a step (a) of continuing the polymerization of the monomers, during which a pressure drop in the reactor is compensated, in other words the pressure in the reactor is kept at a constant value.

According to one embodiment, the pressure drop in step (a) is compensated by injecting a stream into the reactor, this stream preferably being a stream of water.

According to one embodiment, during step (a), the pressure in the reactor is kept substantially constant, and preferably is kept substantially equal to a reference value of between 50 and 130 bar absolute, preferably 70 and 110 bar absolute, more particularly preferably between 80 and 100 bar absolute, and even more preferably between 85 and 95 bar absolute.

According to one embodiment, the method comprises, after step (a):
  a step (b) of continuing the polymerization of the monomers, during which the temperature inside the reactor increases.

According to one embodiment, the temperature inside the reactor during step (a) is less than or equal to 55° C., preferably less than or equal to 52° C., and more particularly preferably less than or equal to 50° C.

According to one embodiment, the temperature inside the reactor increases during step (b) up to a value of greater than or equal to 50° C., and more particularly preferably greater than or equal to 52° C.

According to one embodiment, a molar proportion of at least 60% of the monomers are consumed during step (a), preferably a molar proportion of at least 70% and more particularly of at least 80%.

According to one embodiment, the third monomer is chosen from chlorotrifluoroethylene and 1,1-chlorofluoroethylene, and is preferably chlorotrifluoroethylene.

According to one embodiment, the relative molar proportions of the monomers injected into the reactor are:
- from 50 to 80% of vinylidene fluoride, preferably from 60 to 70%;
- from 15 to 40% of trifluoroethylene, preferably from 25 to 35%; and
- from 1 to 15% of third monomer, preferably from 2 to 10%.

The invention also relates to a polymer able to be obtained according to the method described above.

According to one embodiment, this polymer has a melting point of greater than or equal to 145° C.

The present invention makes it possible to overcome the drawbacks of the prior art. It more particularly provides polymers based on VDF and TrFE having a relatively high melting point and a relatively high mechanical strength, and simultaneously properties of relaxor materials with significant electrostrictive effects.

This is achieved by virtue of a polymerization method in which all the monomers are reacted initially in the reactor, and in which the pressure drop occurring in the reactor due to the polymerization reaction is compensated.

VDF and TrFE are similarly reactive. Consequently, there is no significant shift in composition during polymerization of these two monomers starting from a given mixture. On the other hand, if a third monomer is used, this generally has a different reactivity. Consequently, starting from an initial mixture of VDF, TrFE and third monomer, the content of third monomer tends to increase or decrease during polymerization, depending on the circumstances. This shift generally leads to the formation of a heterogeneous polymer.

In order to correct this shift, and for other practical reasons linked to carrying out the method, a mixture of monomers is generally injected continuously during the reaction.

Nonetheless, the inventors have observed that the consequence of this is to adversely affect the crystalline properties of the material produced, which is thus less mechanically strong and which tends to melt at a lower temperature.

The inventors have moreover discovered that, by bringing together all the monomers which are to react, then by deliberately compensating for the pressure drop in the reactor during polymerization, a polymer is obtained having a high melting point, a high modulus of elasticity, and noteworthy dielectric, especially electrostrictive, properties.

Moreover, the step of continuous injection of a mixture of monomers during polymerization, which is tricky to carry out in practice, is thereby dispensed with.

DESCRIPTION OF EMBODIMENTS OF THE INVENTION

The invention is now described in greater detail and nonlimitingly in the following description.

The method of the invention makes it possible to prepare a polymer starting from monomers comprising VDF, TrFE and a third monomer denoted X. The monomers used preferably consist of VDF, TrFE and a single monomer X, in which case a P(VDF-TrFE-X) terpolymer is obtained. Nonetheless, it is alternatively possible to use yet other additional monomers.

The third monomer may especially be chosen from haloalkenes, especially halogenated propenes or ethylenes, and for example from tetrafluoropropenes (especially 2,3,3,3-tetrafluoropropene) chlorotrifluoropropenes (especially 2-chloro-3,3,3-trifluoropropene) 1-chloro-2-fluoroethylene, trifluoropropenes (especially 3,3,3-trifluoropropene) pentafluoropropenes (especially 1,1,3,3,3-pentafluoropropene or 1,2,3,3,3-pentafluoropropene) 1-chloro-2,2-difluoroethylene, 1-bromo-2,2-difluoroethylene, bromotrifluoroethylene, fluoroethylene (or vinyl fluoride) tetrafluoroethylene and hexafluoropropene.

The third monomer may also be a perfluoroalkyl vinyl ether, of general formula $R_f$—O—CF—CF$_2$, $R_f$ being a preferably C1 to C4 alkyl group. Preferred examples are PPVE (perfluoropropyl vinyl ether) and PMVE (perfluoromethyl vinyl ether).

Nonetheless, the third monomer is particularly preferably CFE (1,1-chlorofluoroethylene) or CTFE (chlorotrifluoroethylene), and most particularly CTFE.

In the remainder of the document, reference will be made solely to CTFE, but the following description can be read replacing CTFE with another monomer.

The method according to the invention may be a method of suspension, solution or emulsion polymerization. It is preferably a method of suspension polymerization, which more particularly preferably is carried out in water.

The invention provides for the injection of all the monomers being reacted initially in a reactor before the start of the reaction. In other words, no injection of monomers occurs during polymerization.

The polymerization reaction is then initiated. This polymerization reaction preferably comprises two steps:
- a step (a) during which a pressure drop in the reactor is compensated;
- a step (b) during which the temperature is increased (without necessarily controlling the pressure).

Step (b) is nonetheless optional.

"Compensating a pressure drop in the reactor" is intended to mean taking one or more active measures which aim to keep the pressure in the reactor above the level it would be at in the absence of these measures. Thus, during step (a), the pressure in the reactor (pressure of the reaction medium) is deliberately adjusted.

For example, it is possible to envisage using a variable volume reactor, the volume of which is decreased (preferably continuously) during step (a).

Alternatively, and more simply, a stream is injected into the reactor during step (a), preferably continuously, so as to compensate for the removal of monomers which are polymerizing. The composition of the stream is chosen so as not to interfere with the polymerization reaction.

It is thus possible to inject a stream of water into the reactor, or a stream of any other liquid which is immiscible with the monomers and inert with regard to the polymerization.

The pressure drop in the reactor is preferably totally compensated. Alternatively, it is partially compensated, in which case a certain reduction in the pressure in the reactor during step (a) is still observed.

During step (a), the pressure in the reactor may be kept above a threshold value. This threshold value may in particular be 60, 65, 70, 75, 80, 85 or 90 bar absolute. At low pressure, the rate of polymerization is slowed to unacceptable levels from a productivity viewpoint.

Alternatively and preferably, the pressure in the reactor may be kept at a substantially constant value during step (a).

The pressure may be kept between 60% and 140% of the initial pressure, preferably between 80% and 120%, and more preferably between 90% and 110% of the initial pressure. By way of example, the pressure may be kept in a range from 80 to 120 bar absolute.

The pressure in the reactor may also be kept substantially equal to a reference pressure value, that is to say kept within a range of ±30% relative to the reference pressure value, or of ±20% relative to the reference pressure value, or of ±10% relative to the reference pressure value, or else of ±5% relative to the reference pressure value.

Preferably, the degree of conversion at the end of step (a), that is to say the molar proportion of monomers consumed by the polymerization reaction, is greater than or equal to 60%, and preferably greater than or equal to 65% or to 70% or to 75% or to 80%.

The compensation of the pressure drop during step (a) makes it possible to avoid the marked slowing down of the reaction kinetics which is observed in the absence of such a compensation, and which leads to a significant limitation on the degree of conversation, or to polymerization durations which are incompatible with the industrial requirements for productivity and capacity.

During step (a), the temperature within the reactor (temperature of the reaction medium) is moreover preferably kept at less than or equal to 55° C., preferably less than or equal to 52° C., and more particularly preferably less than or equal to 50° C. The temperature is also preferably greater than or equal to 35° C., or 40° C. or 45° C. A temperature of 45 to 50° C., and for example of approximately 48° C., may especially be used. Without wishing to be bound by a theory, the inventors believe that this temperature range makes it possible to obtain better properties of crystallinity and melting point.

In order to control the temperature of the reaction medium, the reactor is equipped with means for adjusting the temperature (for example with a jacket in which a heat-transfer fluid circulates).

During step (b), it is advantageous, in order to maximize the degree of conversion and the consumption of the monomers and also in order to reduce the residual amount of non-decomposed initiator at the end of the reaction (since the residual presence of initiator is not favorable from the point of view of the purity and thermal stability characteristics of the product), to increase the temperature, preferably up to a value of greater than or equal to 50° C., or 52° C. For example, the temperature may be increased to approximately 54° C.

At the end of step (b), the degree of conversion is preferably greater than or equal to 80%, more particularly greater than or equal to 85%, and ideally from 90 to 95%.

During step (b), it is possible either to continue to control the pressure or to stop doing so. In this case, during step (b), the pressure generally decreases in the reactor, since the polymerization continues.

During step (b), the pressure in the reactor decreases until it reaches a pressure preferably less than 70 bar absolute, or less than 60 bar absolute, or less than 50 bar absolute, or less than 40 bar absolute.

Once the pressure in the reactor has stabilized, the reactor may be emptied. The recovered product may be filtered, washed and dried in a manner known per se.

Step (b) must preferably lead to the production of a relatively small proportion of polymer, in order to avoid adversely affecting the performance thereof.

Generally, the VDF/TrFE molar ratio of the monomers brought together in the reactor is from 55:45 to 75:25 and more preferably from 62:38 to 72:28.

According to certain embodiments, this VDF/TrFE molar ratio is from 55:45 to 56:44 or from 56:44 to 57:43 or from 57:43 to 58:42 or from 58:42 to 59:41 or from 59:41 to 60:40 or from 60:40 to 61:39 or from 61:39 to 62:38 or from 62:38 to 63:37 or from 63:37 to 64:36 or from 64:36 to 65:35 or from 65:35 to 66:34 or from 66:34 to 67:33 or from 67:33 to 68:32 or from 68:32 to 69:31 or from 69:31 to 70:30 or from 70:30 to 71:29 or from 71:29 to 72:28 or from 72:28 to 73:27 or from 73:27 to 74:26 or from 74:24 to 75:25.

Generally, the molar proportion of the CTFE monomers relative to the total amount of starting monomers is from 1 to 15%. Preferred ranges are from 1 to 10%, preferably from 2% to 8% and more preferably from 3% to 5%.

According to certain embodiments, this molar proportion of CTFE is from 1 to 1.5% or from 1.5 to 2% or from 2 to 2.5% or from 2.5 to 3% or from 3 to 3.5% or from 3.5 to 4% or from 4 to 4.5% or from 4.5 to 5% or from 5 to 5.5% or from 5.5 to 6% or from 6 to 6.5% or from 6.5 to 7% or from 7 to 7.5% or from 7.5 to 8% or from 8 to 8.5% or from 8.5 to 9% or from 9 to 9.5% or from 9.5 to 10%.

The reaction may be initiated by adding a radical polymerization initiator, which may especially be an organic peroxide such as a peroxydicarbonate. It is generally used in an amount of 0.1 to 10 g per kilogram of total monomer load. The amount used is preferably from 0.5 to 5 g/kg.

The initiation of the reaction per se is generally carried out by the combined action of an addition of the polymerization inhibitor and a rise in temperature, which is accompanied by a rise in pressure (the initiator may be added to the reactor before the monomers or after the monomers).

Moreover, it is advantageous to add an agent which regulates the chain length to the reaction medium. Use may especially be made of ethyl acetate or diethyl carbonate or an alcohol such as isopropanol, for example, in an amount of 5 to 100 g per kilogram of total monomer load. The amount used is preferably from 10 to 40 g/kg.

Moreover, it is advantageous to add a suspension agent to the reaction medium. Use may especially be made of a cellulose derivative, in particular a cellulose ether such as methyl cellulose, ethylhydroxyethylcellulose, or hydroxypropylmethylcellulose, in an amount from 0.1 to 5 g per kilogram of total monomer load. The amount used is preferably from 0.3 to 1.5 g/kg.

According to one embodiment, the chain-regulating agent, the polymerization initiator and the suspension agent are introduced into the reactor before the monomers are introduced.

The reaction medium is preferably stirred during the polymerization reaction.

In the polymer obtained according to the method of the invention, the VDF/TrFE molar ratio of the structural units of the polymer is from 55:45 to 75:25, and more preferably from 62:38 to 72:28.

According to certain embodiments, this VDF/TrFE molar ratio is from 55:45 to 56:44 or from 56:44 to 57:43 or from 57:43 to 58:42 or from 58:42 to 59:41 or from 59:41 to 60:40 or from 60:40 to 61:39 or from 61:39 to 62:38 or from 62:38 to 63:37 or from 63:37 to 64:36 or from 64:36 to 65:35 or from 65:35 to 66:34 or from 66:34 to 67:33 or from 67:33 to 68:32 or from 68:32 to 69:31 or from 69:31 to 70:30 or from 70:30 to 71:29 or from 71:29 to 72:28 or from 72:28 to 73:27 or from 73:27 to 74:24 or from 74:24 to 75:25.

The molar proportion of the structural units of CTFE relative to the total structural units of the polymer is generally from 1 to 15%. Preferred ranges are from 1 to 10%, preferably from 2% to 8% and more preferably from 3% to 5%.

According to certain embodiments, this molar proportion of CTFE is from 1 to 1.5% or from 1.5 to 2% or from 2 to 2.5% or from 2.5 to 3% or from 3 to 3.5% or from 3.5 to 4% or from 4 to 4.5% or from 4.5 to 5% or from 5 to 5.5% or from 5.5 to 6% or from 6 to 6.5% or from 6.5 to 7% or from 7 to 7.5% or from 7.5 to 8% or from 8 to 8.5% or from 8.5 to 9% or from 9 to 9.5% or from 9.5 to 10%.

The VDF/TrFE molar ratio in the polymer may be determined by proton NMR. The polymer is dissolved in a suitable deuterated solvent and the NMR spectrum is recorded on an FT-NMR spectrometer fitted with a multinuclear probe. The hydrogen nucleus of the TrFE unit ($CHF=CF_2$) gives a distinctive signal at around 5 ppm, whereas the 2 hydrogen atoms of the $CH_2$ group of the VDF units give a broad unresolved peak centered at 3 ppm. The relative integration of both signals gives the relative abundance of both monomers, that is to say their molar ratio.

The amount of CTFE can be determined by measuring the chlorine content by elemental analysis. The combination of both results makes it possible to calculate the molar composition of the terpolymer.

The weight average molar mass Mw of the polymer is preferably at least 100 000, preferably at least 200 000, and more preferably at least 300 000 or at least 400 000. It can be adjusted by modifying certain process parameters, such as the temperature in the reactor, or by adding a transfer agent.

The molecular weight distribution can be estimated by SEC (Size Exclusion Chromatography) with dimethylformamide (DMF) as an eluent, with a set of 3 columns of increasing porosity. The stationary phase is a styrene-DVB gel. The detection method is based on a refractive index measurement, and calibration is performed with polystyrene standards. The sample is put into solution at 0.5 g/l in DMF and filtered over a 0.45 μm nylon filter.

The molecular weight can also be evaluated by melt flow index measurement at 230° C. under 5 kg load according to ASTM D1238 (ISO 1133).

Moreover, the molecular weight may also be characterized by a solution viscosity measurement according to ISO 1628. Methyl ethyl ketone (MEK) is a preferred solvent of terpolymers for the determination of the viscosity index.

The polymers obtained advantageously have a melting point of greater than or equal to 130° C.; or greater than or equal to 135° C.; or greater than or equal to 140° C.; or greater than or equal to 145° C.; or greater than or equal to 150° C.

The melting point is measured by differential scanning calorimetry (DSC) on a 5 to 20 mg sample of polymer. This technique consists in measuring the differences in the heat exchanges between the sample to be analyzed and a reference. It makes it possible to determine phase transitions, including especially the melting point, and the enthalpies corresponding to these phenomena. For the terpolymers of the invention, the temperature range scanned is from −20° C. to 200° C., at a rate of 10° C. per minute. At least 2 cycles (2 heating operations and 2 cooling operations) are carried out. The melting point is, by convention, the value at the maximum of the melting peak, and the enthalpy of fusion, which is proportional to the degree of crystallinity of the sample, is determined according to standard ASTM E537-02.

Films can be prepared using the terpolymer of the invention, for instance by solvent casting or extrusion or hot melt pressing, and subsequent annealing (i.e. heating, for example for a few hours at a temperature of 100-120° C., and cooling).

For example, a polymer powder can be dissolved in DMF at a concentration of 3%, and then filtered with a 1 μm filter. The solution can be poured onto a clean glass slide on a hotplate set at 60° C. After drying for approximately 5 hours, the film can be peeled off and dried in a vacuum oven at 100° C. overnight. The dried film can be stretched in one direction with a stretching ratio of approximately 5-7. The stretched film can be annealed in a forced air oven at 80° C. for 5 hours, and then at a temperature of between 105° C. and 120° C. for 3 hours.

The invention makes it possible to obtain thin films having a thickness which is as small as 1 to 5 μm, and preferably 1 to 3 μm. If necessary, films having an intermediate thickness of 15 to 25 μm are prepared first, and then are stretched by a factor of 2 to 10, preferably 5 to 7 (e.g. as described above), so as to obtain the desired final thickness.

The films of the invention are preferably characterized by a dielectric constant at 1 kHz and at 25° C. which is less than 40, and more preferably less than 30 or less than 20.

In order to measure the dielectric characteristics of the polymer film, the film is metallized by sputtering 30 nm thick gold electrodes on both surfaces with a diameter of 12 mm. The metallized film specimen is held between two silver metal connectors inside a Delta Design oven. A QuadTech 7600 Plus impedance analyzer is used to measure the capacitance, dissipation factor, and dielectric constant as a function of temperature and frequency.

The films of the invention are also preferably characterized by an elastic modulus of at least 0.5 GPa, and more preferably at least 0.6 GPa, or at least 0.7 GPa, or at least 0.8 GPa, or at least 0.9 GPa or at least 1 GPa or at least 1.1 GPa or at least 1.2 GPa or at least 1.3 GPa or at least 1.4 GPa.

The elastic modulus is measured according to ASTM D1708. Specimens are cut with a dog bone die cutter, with a width of 5 mm and a length of 22 mm. An Instron Model 5866 apparatus is used to measure the modulus. A 100 N load cell is used with a cross-head speed of 25.4 mm/min. The test temperature is 23° C. The secant modulus at 1% strain is used.

These films are also preferably characterized by an electrostrictive strain at 25° C. of at least 0.25%, preferably at least 0.4%, more preferably at least 1%, or at least 1.5%, under an electric field gradient of 50 MV/m. Alternatively, they can be characterized by an electrostrictive strain at 25° C. of at least 0.7%, preferably at least 1%, more preferably at least 1.5%, or at least 2%, or at least 2.5%, or at least 3%, under an electric field gradient of 100 MV/m. In some other embodiments, the electrostrictive strain under an electric field gradient of 100 MV/m is less than 3%, for instance less than 2.5% or less than 2%.

In order to measure the electrostrictive strain under the applied field, the strain specimen is metallized on both sides with a gold electrode of 25 mm×13 mm. The 13 mm direction is parallel to the stretching direction. Thin metal wires are adhered to the metallized area with silver epoxy. A small tension is applied on the metallized specimen of the order of 10-20 g (along the stretching direction), and an electric field is applied to the specimen. The change of the specimen dimension in the stretching direction is monitored by a Computar CCD camera which is connected to a computer using the LabView program. The strain is defined by the change of specimen length/initial specimen length.

The polymers obtained according to the invention may especially be used in the manufacture of actuators (in haptics, microfluidics, steerable catheters, in braille keyboards, etc.), acoustic devices (loudspeakers or tweeters), organic thin-film transistors (OTFT), these polymers then being able to provide the dielectric material of the gate.

EXAMPLE

The following examples illustrate the invention without limiting it.

Example 1

A 3 l stirred reactor containing demineralized water and 0.5 g of hydroxypropylmethylcellulose is carefully deaerated and then cooled to 15° C.

18 g of ethyl acetate (agent which regulates chain length) and 2.7 g of n-propyl peroxydicarbonate (initiator) are introduced into the reactor. The VDF, TrFE and CTFE monomers are then injected in a molar proportion of 65/31/4, in an amount such that the autogenous pressure of the reactor is 90 bar when the internal reactor temperature reaches 48° C.

The reaction starts, and the pressure drop is compensated by injecting pressurized water. When 521 g of water have been introduced, the injection is stopped and the pressure is allowed to drop while gradually increasing the temperature up to 54° C.

When the pressure is stable in the reactor, the latter is cooled and the contents of the reactor are emptied. The cake recovered is filtered then washed several times in demineralized water, and finally dried in an oven at 60° C. until its weight is constant.

The composition of the polymer obtained is analyzed by a combination of $^1$H NMR and $^{19}$F NMR and characterized thermally by differential scanning calorimetry (DSC). The composition found is 62.5/32.8/4.7 in VDF/TrFE/CTFE, respectively. The melting point is measured at 149.3° C. with an enthalpy of fusion of 20 J/g. A film manufactured with this polymer has an elastic modulus of greater than 700 MPa. It also has a relaxor character with a fine hysteresis.

Example 2 (Comparative)

An initial load of VDF and TrFE with a composition of 65/35 in molar proportions is introduced into a carefully deoxygenated 3 l reactor containing demineralized water and 0.4 g of hydroxypropylmethylcellulose and which has been cooled to 15° C.

The reactor is then heated to the initial polymerization temperature of 46° C. The pressure in the reactor reaches 80 bar. 2.5 g of initiator in solution in 10 g of ethyl acetate are then injected into the reactor in order to start the reaction.

The consumption of the monomers linked to polymerization is compensated by the injection of a mixture of the 3 monomers VDF, TrFE and CTFE, in respective proportions of 60.4/32.3/7.4, and by keeping the pressure in the reactor constant and close to 90 bar.

When 396 g of mixture have been injected, the reaction is stopped by rapid cooling of the reactor, and the contents thereof are emptied. The molar composition of the polymer obtained is measured by NMR as being 61.4/33.9/4.7 and its melting point is found to be equal to 138.9° C. for an enthalpy of 18.8 J/g.

The invention claimed is:

1. A method for preparing a polymer starting from monomers comprising vinylidene fluoride, trifluoroethylene and a third monomer, the method comprising, successively:
injecting all the monomers to be reacted into a reactor;
initiating polymerization of the monomers;
(a) continuing the polymerization of the monomers, during which the pressure in the reactor is kept constant by injecting into the reactor a stream of liquid which is immiscible with the monomers and inert with regard to the polymerization, whereby pressure in the reactor is kept about equal to a reference value of 50-130 bar absolute.

2. The method as claimed in claim 1, in which the pressure is kept constant during (a) by injecting a stream of water into the reactor.

3. The method as claimed in claim 1, in which, during (a), the pressure in the reactor is kept substantially equal to a reference value of 85 to 95 bar absolute.

4. The method as claimed in claim 1, further comprising, after (a):
(b) continuing the polymerization of the monomers, during which the temperature inside the reactor increases.

5. The method as claimed in claim 4, wherein the temperature inside the reactor increases during (b) up to a value of greater than or equal to 50° C.

6. The method as claimed in claim 1, wherein the temperature inside the reactor during (a) is less than or equal to 55° C.

7. The method according to claim 6, wherein the temperature inside the reactor during a) is 35°–50° C.

8. The method as claimed in claim 1, in which a molar proportion of at least 60% of the monomers are consumed during (a).

9. The method as claimed in claim 1, wherein the third monomer is a haloalkene.

10. The method according to claim 9, wherein the haloalkene is 2,3,3,3-tetrafluoropropene, 2-chloro-3,3,3-trifluoropropene, 1-chloro-2-fluoroethylene, 3,3,3-trifluoropropene, 1,1,3,3,3-pentafluoropropene, 1,2,3,3,3-pentafluoropropene, 1-chloro-2,2-difluoroethylene, 1-bromo-2,2-difluoroethylene, bromotrifluoroethylene, fluoroethylene, tetrafluoroethylene or hexafluoropropene.

11. The method as claimed in claim 1, wherein the third monomer is a perfluoroalkyl vinyl ether.

12. The method according to claim 11, wherein the third monomer is PPVE (perfluoropropyl vinyl ether) or PMVE (perfluoromethyl vinyl ether).

13. The method as claimed in claim 1, wherein the third monomer is chlorotrifluoroethylene or 1,1-chlorofluoroethylene.

14. The method as claimed in claim 1, wherein the relative molar proportions of the monomers injected into the reactor, based on the total amount of monomers injected, are:
from 50 to 80% of vinylidene fluoride;
from 15 to 40% of trifluoroethylene; and
from 1 to 15% of third monomer.

15. A polymer able to be obtained according to the method of claim 1, having a melting point of greater than or equal to 145° C.

16. A film comprising the polymer able to be obtained according to the method of claim 1, said polymer having a melting point of greater than or equal to 145° C., said film having a thickness from 1 to 5 µm and a dielectric constant of less than 40.

* * * * *